United States Patent [19]

Alessio

[11] Patent Number: 4,892,276
[45] Date of Patent: Jan. 9, 1990

[54] COLLAR FOR FASTENING PIPES, CABLES, RODS AND THE LIKE

[76] Inventor: Walter Alessio, 24 Via E.Fermi, Paderno Dugnano MI, Italy

[21] Appl. No.: 258,792

[22] Filed: Oct. 17, 1988

[51] Int. Cl.⁴ ............................................. F16L 3/10
[52] U.S. Cl. .................................. 248/74.1; 16/231; 16/268; 24/285; 248/231.5; 248/316.5
[58] Field of Search ................ 248/74.1, 73, 67.7, 248/65, 55, 231.5, 316.5; 403/353; 24/284, 285, 282; 16/231, 268, 252, 253, 86.1, 86.2

[56] References Cited

U.S. PATENT DOCUMENTS

| | | | |
|---|---|---|---|
| 1,527,346 | 2/1925 | Brady | 248/74.1 |
| 1,564,918 | 12/1925 | Williams | 248/74.1 |
| 3,152,784 | 10/1964 | Robinson | 248/74.1 |
| 3,243,151 | 3/1966 | Varney et al. | 248/74.1 |
| 4,059,872 | 11/1977 | Delesandri | 248/74.1 X |
| 4,478,381 | 10/1984 | Pittion et al. | 248/74.1 X |
| 4,674,720 | 6/1987 | Fetsch | 248/74.1 |
| 4,783,029 | 11/1988 | Geppert et al. | 248/74.1 |

*Primary Examiner*—Ramon O. Ramirez
*Attorney, Agent, or Firm*—Collard, Roe & Galgano

[57] ABSTRACT

A collar of metal, plastic material, or any other suitable materials, for fastening pipes, rods, and the like, to walls in general, constituted by an arcuate half-clamp, which can be fastened onto the wall by means of a stud or the like, and by an arcuate half-clamp, opposite to the first one, and constrained to this latter, on one side, by means of open-hinge hooking means, and, on the diametrically opposite side, by means of a tighening bolt.

1 Claim, 1 Drawing Sheet

COLLAR FOR FASTENING PIPES, CABLES, RODS AND THE LIKE

DESCRIPTION

The present invention relates to a collar constituted by separable elements of metal, plastic material, or any other suitable materials, particularly suitable for fastening pipes, rods, cables, and similar elements to walls, floors and supports in general.

Different types of pipe-fastening and cable-fastening collars are known for the most different uses; some of them are constituted by a flexible strap of metal or of a plastic material, anchored onto a support wall, and so shaped as to surround the pipe or cable such to bring both of its free ends to partially overlap to, or to join, each other, in order to make it possible the collar to be tightened by means of a threaded screw engaged inside suitable seats provided on said strap ends. Other types of straps, and, in particular, those used to stably stop pipes, rods, cables, and the like, on walls, floors and various types of supports, are constituted by two arcuate, separate elements, having the shape of half-clamps opposite to each other, and substantially having a half-circle shape, so to enclose between them the pipe to be fastened; one of said halfclamps is provided with a stud for anchoring it onto a masonry wall or the like, and both of them are provided with two opposite flanges, such to result facing each other, so to make it possible them to be tightened to each other by means of two bolts, or the like.

In practice, the clamps constituted by two elements opposite to each other, and tightened to each other by means of two diametrically opposite bolts, involve the drawback that for their assemblage, both of operator's hands have to be engaged in order to introduce the tightening bolts inside their seats, and that, to tighten the clamp, the same bolts must be screwed down in such a way that they remain balanced. In order to partially obviate these drawbacks, and, in particular, the need of using both of the operator's hands to introduce the bolts, the upper half-clamp, opposite to the half-clamp anchored onto the support wall, is provided with a transversal slot in correspondence with a bore of the flange protruding from the same half-clamp, and the whole structure is such as to make it possible, with the two opposite bolts being released, the same half-clamp to be turned about a bolt until the shank of the other bolt enters the said slot and then the bore, so to enable the operator to tighten both of said bolts. However, this solution too requires a balanced tightening of the two tie nuts.

DE No. 32 30 800 (SIKLA GmbH) relates to a collar constituted by two arcuate half-clamps which can be hooked to each other by means of a hinge constituted by a closed slot, provided in a central position, having the shape of a partially bent substantially triangular window, provided in the lower half-clamp inside which the hooking means is inserted. Said hooking means is given a flat anchor, or a flat "T"-shape, and is provided at the end of the upper half-clamp.

CH No. 651 904 (VERZINKEREI ZUG AG) relates to a collar constituted by two elements, wherein one element is rigid and has a development of at least 60° and the other is flexible. Said elements can be hooked to each other by means of a hinge constituted by a closed slot, in a central position, having the shape of a rectangular window provided at the end of the upper, flexible element, inside which the hooking means enters.

CH No. 627 535 (O. C. STEEB) relates to a collar constituted by two arcuate elements which can be hooked to each other by means of a hinge constituted by a closed slot having the shape of a substantially rectangular window provided, in a central position, at a certain distance from the end of the lower element, partially bent and rolled up in order to constitute a revolution pivot. Inside said slot, the hooking means is inserted, which is given the shape of a bent hook provided at the end of the upper element.

FR No. 2500571 (WEISS) relates to a collar constituted by two arcuate, relatively flexible elements, each of which extends over a circle angle larger than 180°; said two arcuate elements are hooked to each other not in a hinge fashion, but by means of a coupling constituted by a plurality of closed slots of rectangular window shape provided in the upper, mobile clamp, inside one of which the bent hook shaped hooking means enters, which is provided in a central position at the end of the lower element fastened to the wall. Therefore, a purpose of the present invention is to provide a pipe-fastening collar of the type with two separate elements having a half-clamp shape, which is capable of making it possible the drawbacks to be overcome, which are shown by the pipe-fastening collars known from the prior art, and, above all, such to enable the operator to assemble it by using one of his hands obly, with the advantage that the other operator's hand is left free, to grip the support means, and the like.

Another purpose of the present invention is to provide a pipe-fastening collar which can be easily assembled and tightened, whose cost is substantially analogous to that of the collars known from the prior art, and which can be made either from metal or from a plastic material, or also from other suitable materials.

Still another purpose of the invention is to provide a pipe-fastening collar which can be used for fastening pipes even inside very narrow passage ways, or when the pipes are laid side-by-side very close to each other or inside wall corners, i.e. when the necessary room for revolving the mobile element by at least 180° is not available.

These and still further purposes, which can be more clearly evidenced by the following disclosure, are achieved by a pipe-fastening collar, or the like, of the type constituted by two separate elements, opposite to each other, and arcuate substantially in accordance with the radius of curvature of the pipe or rod to be fastened, which collar is constituted, according to the present invention, by two arcuate half-clamps, opposite to each other, one of which is centrally integral with a stud, or bolt, destined to be anchored onto a support wall or surface, and is provided, at one of its ends, with open-hinge hooking means, and at its other end, with a flat flange wherein a bore for a bolt is provided, and the second half-clamp, opposite to the first one, being provided, at one of its ends, with hooking means which can be coupled with said hinge hooking means provided on the underlying half-clamp, and, at its other end, with a flat flange, which is provided with a bore corresponding to that of the underlying half-clamp, said hinge hooking means being suitable for being coupled with each other with said upper half-clamp is kept lifted, such to make it possible the pipe to be laid inside the underlying half-clamp fastened onto the support wall, and with the two half-clamps being then locked on the pipe by means of one bolt only, which is slid inside the bores of said flat flanges opposite to each other.

More particularly, said hooking means provided on the upper, liftable half-clamp are constituted by two end pins provided axially opposite to each other by means of slots provided at the end of the same half-clamp, and said hooking means provided on the underlying half-clamp, anchored onto the support wall, are constituted by two outwards arcuate flanges, provided at the end of the half-clamp, and such to rotatably house said end pins provided on the upper half-clamp.

The invention, as relates to a preferred, not-exclusive form of practical embodiment thereof, is disclosed in the following in greater detail, by referring to the hereto attached drawing table, supplied to purely indicative and non-limitative purpose, wherein.

Figure 1:
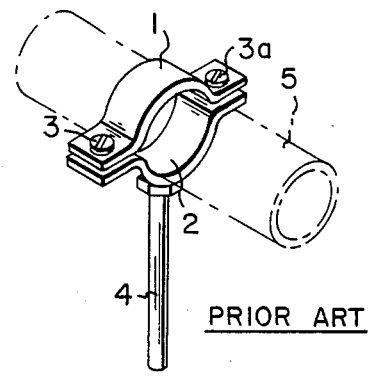
FIGS. 1 and 2 show a perspective view of two collars of known type, given to purely comparative purposes only.
Figure 2:
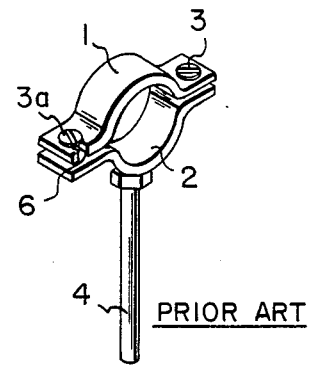
Figure 4:
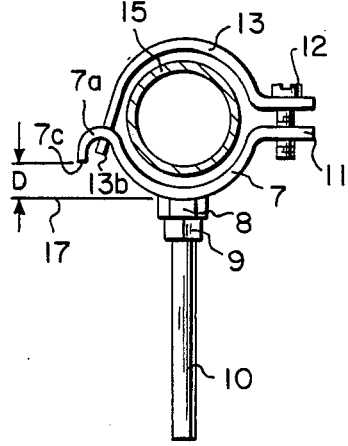
FIG. 4 shows a front view and FIG. 5 shows a sectional view of the pipe-fastening collar according to the axis V—V of the collar of FIG. 3.
Figure 3:
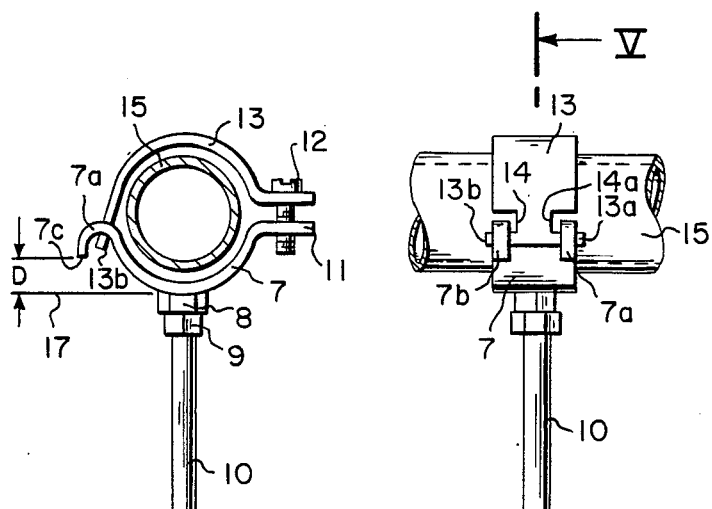
FIG. 3 shows a side view of a pipe-fastening collar accomplished according to the present invention.
Figure 5:
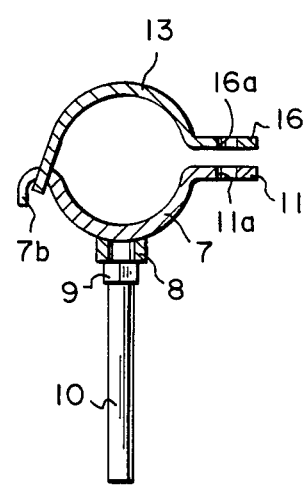

Referring to such Figures, the collar of type known from the prior art of FIG. 1 is constituted by two arcuate half-clamps opposite to each other 1 and 2, whose end flanges are linked to each other by means of tightening bolts 3–3a. The half-clamp 2 is anchored onto a stud or bolt 4 destined to be buried inside a support wall, or the like. It is evident in this case that the pipe 5 to be stopped can be assembled only after dismantling the two bolts 3–3a and the related half-clamp 1; the assemblage requires hence the use of both of the operator's hands, in order to introduce the tightening bolts into the bores provided on the clamp. The collar shown in FIG. 2 has its half-clamps 1 and 2 equal to those of FIG. 1; in this case too, they can be locked to each other by means of two bolts 33a; in this case, the half-clamp 1 is provided with a transversal slot 6 in correspondence with the bore for the bolt 3a which makes it possible, in order to assemble the pipe, to turn the upper half-clamp by turning it about the hinge bolt 3 and then, after the pipe being inserted, the opposite bolt to be inserted, while being already anchored to the underlying half-clamp, into the bore provided on the same upper half-clamp, through the slot 6. Also in this case, two tightening bolts are necessary; tightening them in a way as balanced as possible is necessary as well. Furthermore, in order that the operator may turn the half-clamp 1 around the bolt 3, with the pipe to be stopped being already inserted inside its seat, it is necessary to release the bolt 3 to a large extent, and the whole process results anyway uncomfortable and not very practicable.

the pipe-fastening collar to which the present invention is directed is constituted, on the contrary (see FIGS. 3, 4 and 5), by an arcuate half-clamp 7 fixed, preferably by welding, to a bolt or protruding element 8, with which, by means of a lock-nut, or the like, 9, a shank or stud 10, which is destined to be buried inside a collar support wall, is made integral. The half-clamp 7 is provided, at an end thereof, with a flat flange 11, wherein provided is a bore 11a (FIG. 5) for a tightening bolt 12, and, at its diametrically opposite wall, it shows two outwards-arcuate flanges 7a–7b, whose convexity is orientated upwards, destined to constitute two half-hinges to be coupled with two axial pins provided at an end of an arcuate half-clamp 13, opposite to the half-clamp 7. Said coaxial pins, indicated by the reference numerals 13a and 13b, are substantially obtained by providing two quadrangular slots 14–14a (FIG. 3) on the opposite sides of the end of the upper half-clamp 13. the two axial pins 13a and 13b substantially constitute the pivots around which the arcuate flanges 7a–7b provided on the lower half-clamp respectively turn; the upper half-clamp 13 can be therefore hooked, in a hinge-fashion, to the underlying half-clamp, and can be lifted, after being hooked, up to allow the pipe 15 to be entered and stopped and laid inside the hollow of the lower half-clamp 7. The upper half-clamp is also provided with a flat, protruding flange 16 with a bore 16a corresponding to the bore of the underlying flange 11. In practice, in as much as the support 8 of the support stud 10 comes to be, after the assemblage, substantially flush with the support wall (indicated by the dotted line 17 in FIG. 4), the distance "D" between the wall 17 and the base 7c of the two upwardsarcuate flanges 7a–7b of the half-clamp 7 must be kept equal to a value such to allow the two pins 13a–13b of the upper half-clamp to be easily slid inside the two arcuate flanges 7a–7b during the hinge-coupling of the two half-clamps.

the assemblage of the collar according to the present invention is therefore carried out by anchoring the pin 10 to a support wall, then hooking the pins 13a–13b inside the arcuate flanges 7a–7b and then, with the upper half-flange 13 being kept lifted, laying the pipe 15 inside the hollow defined by arcuate portion of the half-clamp 7. The upper half-clamp is then turned over the pipe, and this latter is clamped by means of the only bolt 12.

The collar according to the present invention is advantageously used in the building industry, in the automobile sector to fasten, e.g., exhaust ducts, cables, and the like, and in the electrical sector to fasten electrical cables, and the like. Furthermore, the inner surface of the half--clamps can be roughened, knurled or glazed, or otherwise treated for the purpose of increasing the friction, and the slipping strength of the pipe; said inner surfaces can also be coated with layers of rubber, or of other materials, such to constitute gaskets, or the like.

Finally, it is obvious that to the invention, as herein disclosed and illustrated, modifications and variants can be supplied, which are structurally and functionally equivalent, without leaving the scope of protection of the same invention.

I claim:

1. A pipe-fastening collar of the type having a first upper and a second lower arcuate half-clamps arranged opposite each other, the lower half-clamp being centrally integral with a stud anchored onto a support surface, wherein:

said first upper half-clamp is provided at a first end with a flat flange having a bore for a bolt therein and at a second end opposite said first end with hooking means consisting of two end pins, axially opposite each other, defined by two slots provided on both sides of said half-clamp end; and said second lower half-clamp is provided at a first end with a flat flange having a bore corresponding to the bore of said first upper half-clamp and at a second end opposite said first end with open hinge hooking means consisting of two flanges arcuate upwards and towards the outside of the half-clamp, so as to rotatably house said end pins of said first upper half-clamp.

* * * * *